US012793095B2

(12) United States Patent
Sarkar et al.

(10) Patent No.: US 12,793,095 B2
(45) Date of Patent: Nov. 10, 2026

(54) GENERATING ENGAGEMENT SCORES USING MACHINE LEARNING MODELS FOR USERS INTERACTING WITH VIRTUAL OBJECTS

(71) Applicant: INTERNATIONAL BUSINESS MACHINES CORPORATION, Armonk, NY (US)

(72) Inventors: Sanmitra Sarkar, Kolkata (IN); Mukundan Sundararajan, Bangalore (IN); Jignesh Karia, Thane (IN); Sumitro Ghatak, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 18/590,104

(22) Filed: Feb. 28, 2024

(65) Prior Publication Data

US 2025/0272701 A1 Aug. 28, 2025

(51) Int. Cl.
*G06Q 30/0202* (2023.01)
*G06F 3/01* (2006.01)
(Continued)

(52) U.S. Cl.
CPC ......... *G06Q 30/0202* (2013.01); *G06F 3/012* (2013.01); *G06F 3/013* (2013.01);
(Continued)

(58) Field of Classification Search
CPC .... G06Q 30/0202; G06N 20/00; G06F 40/40; G06F 3/012; G06F 3/013; G06T 19/006
See application file for complete search history.

(56) References Cited

U.S. PATENT DOCUMENTS 11,914,765 B2 * 2/2024 Doken .................... G06F 3/013
2018/0211285 A1 7/2018 Todasco et al.
(Continued)

FOREIGN PATENT DOCUMENTS

JP 4848399 B2 12/2011
WO WO-2023158797 A1 * 8/2023 ............. G06F 3/011

OTHER PUBLICATIONS

"Combining Virtual Reality Advertising and Eye Tracking to Understand Visual Attention: A Pilot Study", Wang et al (Year: 2019).*
(Continued)

*Primary Examiner* — Charles Guiliano
*Assistant Examiner* — Theodore Xie
(74) *Attorney, Agent, or Firm* — Seed Intellectual Property Law Group LLP

(57) ABSTRACT

Provided are a computer program product, system, and method for generating engagement scores using machine learning models for users interacting with virtual objects. Movement parameters are received from tracking devices from a user in a real-world while the user is interacting with a virtual object in the extended-reality environment. The movement parameters are processed to determine a first engagement score indicating user interest in the real-world entity represented by the virtual object. A determination is made of on user information access requests with respect to the real-world entity. The information on the user information access requests is inputted to an engagement machine learning model to output a second engagement score indicating user interest in the real-world entity. The first engagement score and the second engagement score are outputted to provide information on an efficacy of the virtual object in promoting interest in the real-world entity.

20 Claims, 7 Drawing Sheets

(51) Int. Cl.

| | |
|---|---|
| ***G06F 40/40*** | (2020.01) |
| ***G06N 20/00*** | (2019.01) |
| ***G06T 19/00*** | (2011.01) |

(52) U.S. Cl.
CPC ............. *G06F 40/40* (2020.01); *G06N 20/00* (2019.01); *G06T 19/006* (2013.01)

(56) References Cited

U.S. PATENT DOCUMENTS

| | | | | |
|---|---|---|---|---|
| 2019/0007781 | A1* | 1/2019 | Peters .................. | G02B 27/017 |
| 2021/0004437 | A1* | 1/2021 | Zhang ................... | G06F 40/205 |
| 2022/0126206 | A1 | 4/2022 | Rossi et al. | |
| 2023/0368262 | A1* | 11/2023 | Kumar ............... | G06Q 30/0629 |
| 2024/0249318 | A1* | 7/2024 | Spiegel ................... | H04L 51/02 |

OTHER PUBLICATIONS

"Virtual Worlds Design/Interaction Meter," IP.com, IP.com No. IPCOM000191424D, Jan. 4, 2010, 3 pp.

* cited by examiner

Real-World Movement Parameters

Virtual Object Engagement Training Set Instance

Real-World Engagement Training Set Instance

GENERATING ENGAGEMENT SCORES USING MACHINE LEARNING MODELS FOR USERS INTERACTING WITH VIRTUAL OBJECTS

BACKGROUND OF THE INVENTION

1. Field of the Invention

The present invention relates to a computer program product, system, and method for generating engagement scores using machine learning models for users interacting with virtual objects.

2. Description of the Related Art

People may engage in a virtual world, such as a metaverse, using extended-reality headsets to render the virtual world in the user field-of-vision. Participants in the metaverse may also manipulate virtual reality hand controllers to interact with virtual objects in the virtual world. Third parties may have the metaverse provider generate virtual objects into the metaverse representing real-world items of interest to the third parties. Extended-reality (ER) headsets, or glasses, comprise wearable computer-capable glasses or goggles that generate virtual objects, such as three-dimensional images, text, animations, and videos, to overlay into the wearer's field of vision to enable the wearer to view and interact with the virtual objects in the virtual environment.

Extended reality, as that term is used herein, refers to any of virtual reality (VR), where the entire view of the user is synthetic imagery, augmented reality (AR) where virtual objects or synthetic imagery are added to a view of a real environment, mixed reality (MR) where there is a combination of synthetic and real imagery to form the space, and augmented virtuality (AV) where real imagery is added to a synthetic environment. Thus, extended reality, as that term is used herein, falls on the continuum from total virtuality or total synthetic imagery to a combination of synthetic and real imagery.

SUMMARY

Provided are a computer program product, system, and method for generating engagement scores using machine learning models for users interacting with virtual objects. Movement parameters are received from tracking devices from a user in a real-world while the user is interacting with a virtual object in the extended-reality environment. The movement parameters are processed to determine a first engagement score indicating user interest in the real-world entity represented by the virtual object. A determination is made of on user information access requests with respect to the real-world entity. The information on the user information access requests is inputted to an engagement machine learning model to output a second engagement score indicating user interest in the real-world entity. The first engagement score and the second engagement score are outputted to provide information on an efficacy of the virtual object in promoting interest in the real-world entity.

DETAILED DESCRIPTION

Participants in a metaverse may interact with virtual objects in an extended-reality environment that represent real-world entities. Providers of the real-world entities may want to know the efficacy of the virtual objects in promoting user engagement with a real-world entity, represented by the virtual object, in the real-world. Described embodiments provide improvements to computer technology to determine an extent to which user engagement with a virtual object in an extended-reality environment will result in the user engaging with a real-world entity, in the real world, represented by the virtual object. Described embodiments gather movement parameters from the user physical movements and reactions in a real-world location while interacting with a virtual object in the extended-reality world. Described embodiments provide a virtual object machine learning model that may receive as input the gathered movement parameters, based on user corporeal interaction, and output a virtual object engagement score predicting the extent to which the user will interact with the real-world entity, such as acquire or purchase.

To validate the virtual object engagement score, described embodiments further gather information on user information access requests for the real-world entity and input to a real-world entity engagement machine learning model to output a second engagement score predicting the extent to which the user will interact with, such as acquire or purchase, the real-world entity. By having two engagement scores outputted by different machine learning models trained on different types of inputs, the engagement scores may validate one another to indicate the validity or usefulness of the engagement score, which reflects on the efficacy of the virtual object in promoting interest in the real-world entity.

Though this disclosure pertains to the collection of personal data (e.g., real-world movement parameters, extended-reality movement parameters, text of virtual agent interactions, real-world information gathering activities, user information, including demographic information, etc.), it is noted that in embodiments, users opt into the system. In doing so, users (or their guardians) are informed of what data is collected and how it will be used, that any collected personal data may be encrypted while being used, that the users can opt-out at any time, and that if they opt out, any personal data of the user is deleted.

Figure 1:
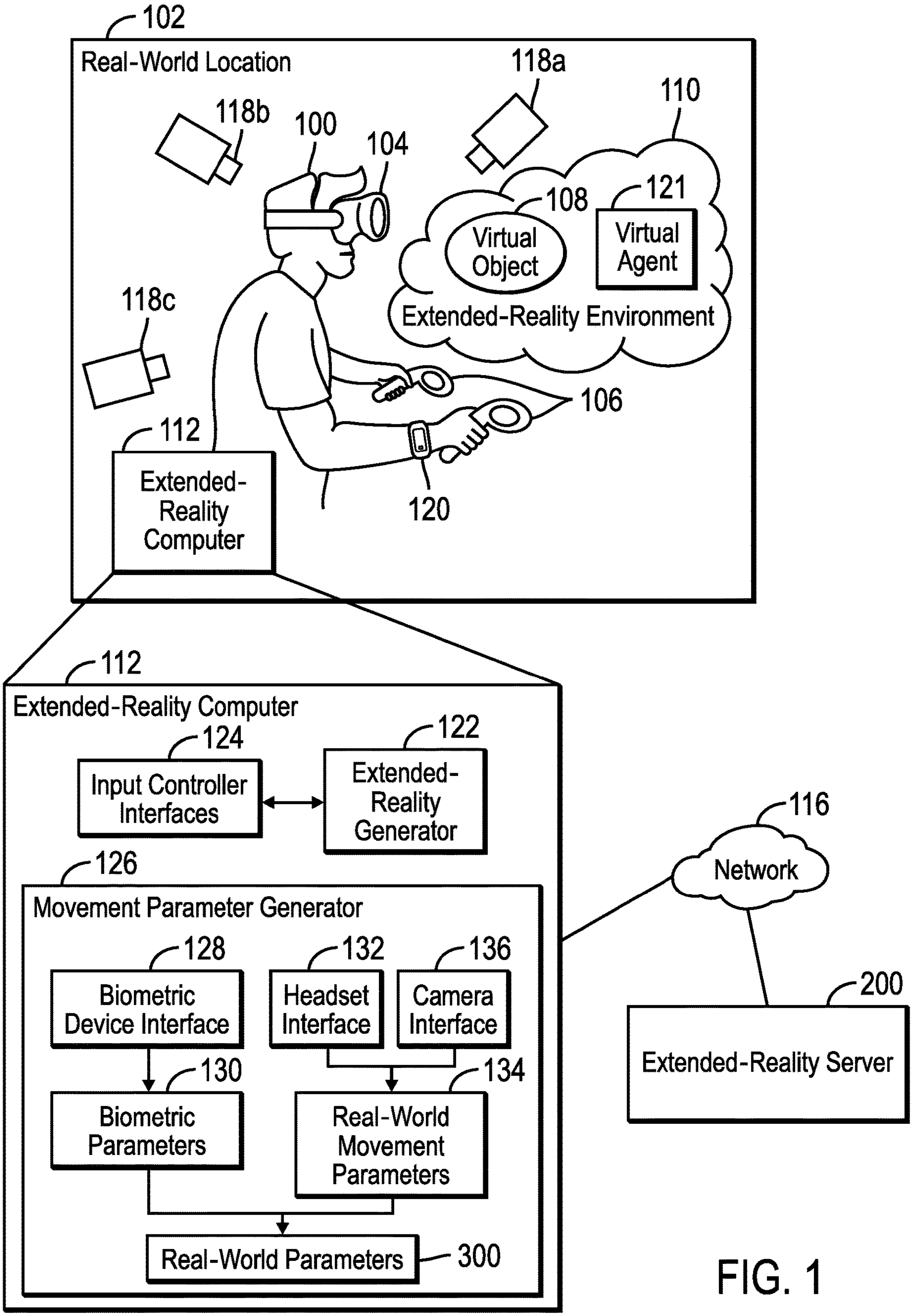
FIG. 1 illustrates an embodiment of a computing environment to generate an extended-reality environment in which users may interact with virtual objects.

FIG. 1 illustrates an embodiment of a user 100 in a real-world location 102 wearing an extended-reality headset 104 and manipulating extended-reality hand controllers 106, or other input devices, to interact with a virtual object 108 rendered in a mixed-reality environment 110 in which the user 100 interacts. The virtual object 108 may represent a real-world entity, such as a product, service, item, etc., to provide information on the real-world entity to encourage the user to engage with the real-world entity in the real world. An extended-reality computer 112 renders the mixed-reality environment 110, including objects therein, with which the user may interact. The mixed-reality computer 112 may receive the elements of the mixed-reality environment 110 to render from a mixed reality server 200 over a network 116. The real-world location 102 further includes one or more cameras 118*a*, 118*b*, 118*c* to capture real-world movements of the user 100 while interacting with a virtual object 108 in the extended-reality environment 110. The user 100 may further have wearable sensors 120, such as a biometric gathering device to gather biometric data on the user 100 while engaged with the virtual object 108, such as heart rate, oxygen level, perspiration, steps, movement, etc.

FIG. 1 shows the components of the extended-reality computer 112 as including an extended-reality generator 122 that renders the extended-reality environment 110 and elements therein, in the headset 104, from extended-reality environment renderings communicated by the extended-reality server 200. The extended-reality generator 122 may generate the virtual object 108 and a virtual agent 121 in the extended-reality environment 110. The virtual agent 121 may comprise a virtual chatbot or other interface rendered in the extended-reality environment 110 to allow the user to request information, such as information on the real-world entity represented by the virtual object 108.

Input controller interfaces 124, comprising software drivers to receive the commands from the extended-reality controllers 106 and other input devices, provide feedback to the extended-reality generator 122 to control the user interaction in the extended-reality environment 110. A movement parameter generator 126 includes software drivers to receive input from the devices monitoring the user 100, including a biometric device interface 128 to receive biometric data from the wearable sensors 120 and generate biometric parameters 130 having the gathered biometric information as a function of the engagement time with the virtual object 108, including heart rate, perspiration, oxygen level, etc.; a headset interface 132 to receive information gathered from the headset 104 including gaze tracking information and eye movements to include in the real-world movement parameters 134; and a camera interface 136 to receive video, images and body speed information captured by the cameras 118*a*, 118*b*, 118*c* and generate movement parameters during the engagement time based on the captured images and sensed body speed, including right-hand mixed reality controller handset coordinates, left-hand mixed reality controller handset coordinates, headset angles, and body speeds, during the engagement time, to include in the real-world movement parameters 300.

The movement parameter generator 126 may further generate derivative information to include in the real-world movement parameters 300, such as angular displacement of the extended-reality hand controllers 106 with respect to the headset 104. For instance, based on a gathered headset angle ($\theta_t$), right-hand controller coordinates ($rhc_t$), and left-hand controller coordinates ($lhc_t$) at time t, the angular displacement at time t may be calculated according to equation (1) below:

$$d_t = f(h, rhc, lhc) = \sqrt{(x_2 - x_1)^2 + (y_2 - y_1)^2 + (z_2 - z_1)^2} * \left(\frac{\theta}{360}\right) * 2\pi \quad (1)$$

The movement parameter generator 126 may further calculate another input including a calculated engagement score at time t as a function of the angular displacement ($d_t$) and a body speed ($s_t$) at time t, calculated according to equation (2) below, where α comprises an extended-reality constant.

$$d/s * \alpha \quad (2)$$

The extended reality computer 112 may comprise a computer system embedded in the headset 104, a wearable computer worn by the user 100 or console at the real-world location 102.

Figure 2:
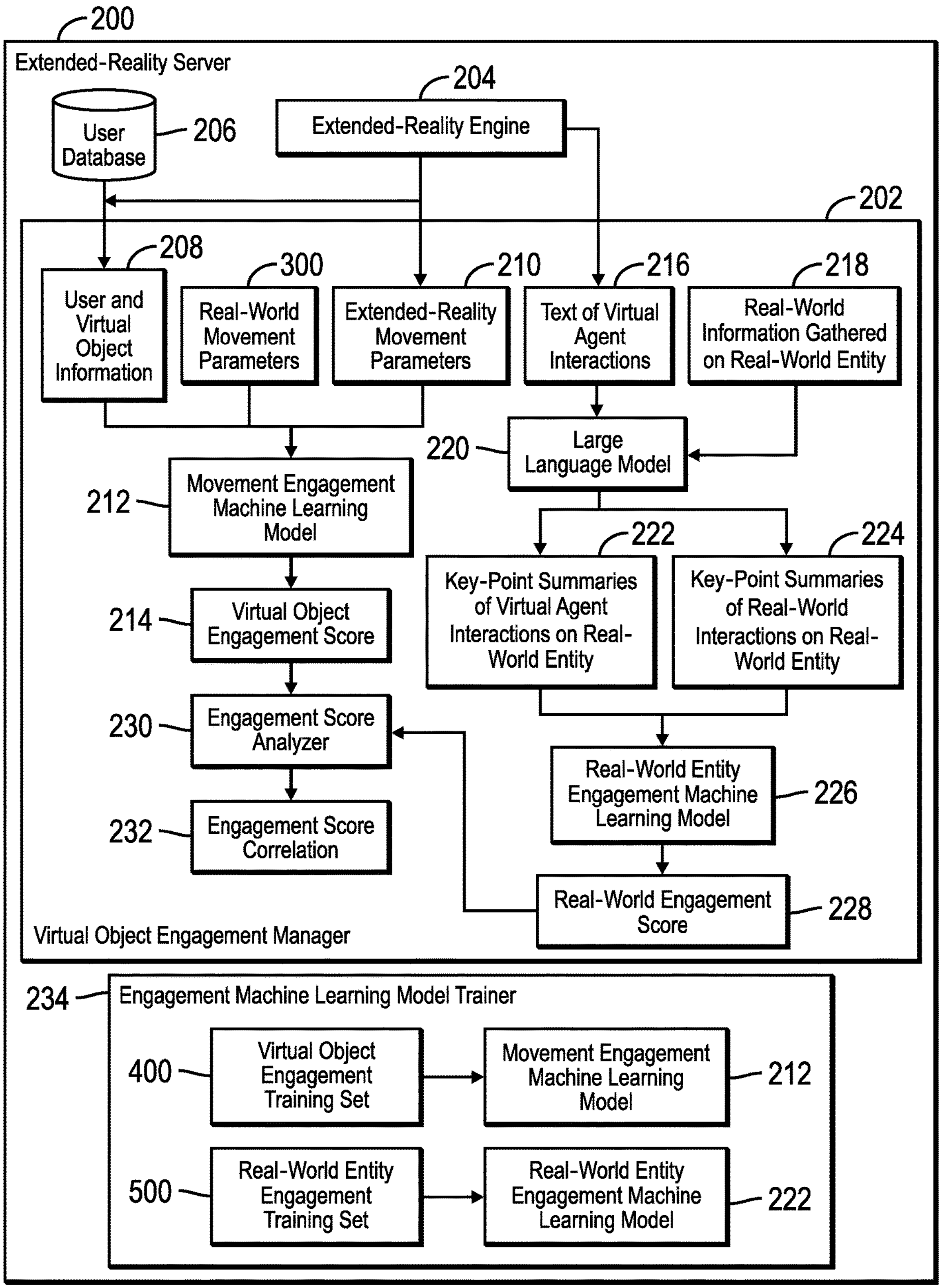
FIG. 2 illustrates an embodiment of an extended-reality server to generate engagement scores predicting user interaction with a real-world entity represented by the virtual object with which the user is interacting in the extended-reality environment.

FIG. 2 illustrates an embodiment of the extended-reality server 200 having a virtual object engagement manager 202 to calculate an engagement score with respect to the user interaction with the virtual object indicating a likelihood the user will further interact with or acquire a real-world entity represented by the virtual object 108, such as a product, service or other item. The extended-reality server 200 includes an extended-reality engine 204 to generate mixed-reality environments 110 for users whose information is maintained in a user database 206.

The virtual object engagement manager 202 gathers user and virtual object information 208 from the user database 206 and extended-reality engine 204, real-world movement parameters 300 provided from the user extended-reality computer 112, and extended-reality movement parameters 210 having data captured on the user movement in the extended-reality environment 110 from the extended-reality engine 204. The gathered inputs 208, 300, 210 are inputted into a movement engagement machine learning model 212 to generate a virtual object engagement score 214 indicating a likelihood the user will further engage with the real-world entity represented by the virtual object 108, such as purchase or acquire the real-world entity. The movement engagement machine learning model 212 comprises a machine learning model trained to output a predicted engagement score indicating a likelihood of a further interaction with the real-world entity, such as purchase or acquisition or other engagement action.

The virtual object engagement manager 202 gathers text of virtual agent interactions 216 with respect to the real-world entity in the extended-reality environment 110 and real-world information 218 the user access on the real-world entity in the real world, such as web sites accessed, inquiries with providers of the real-world entity, etc. The real-world information 218 may be difficult to obtain and require additional monitoring programs, such as use of web browser cookies and add-ins. The text of virtual agent interactions 216 and real-world information 218 are inputted to a large language model 220 to generate key-point summaries and user intent 222 and 224 for the virtual agent interactions 216 and real world gathered information 218, respectively. The key point summaries and user intent 222 and 224 are then inputted into a real-world entity engagement machine learning model 226 to output a predicted real-world engagement score 228 indicating a likelihood the user will further engage with the real-world entity represented by the virtual object 108, such as purchase or acquire the real-world entity. The real-world entity engagement machine learning model 226 comprises a machine learning model trained to output a predicted engagement score indicating a likelihood of a further interaction with the real-world entity, such as purchase or acquisition or other engagement action.

An engagement score analyzer 230 receives the virtual object engagement score 214 and the real-world entity score 228, and calculates an engagement score correlation 232 between the two engagement scores 228 and 230. The engagement scores 228 and 230 may be used to confirm the accuracy of each other in predicting the user engagement, such as to purchase the real-world entity product or service. For instance, the real-world engagement score 228, based on information the user gathers on the real-world entity in the real world, may confirm each other or indicate they cannot be validated. In this way, correlation of the scores may confirm the engagement score.

The extended-reality server 200 may further include an engagement machine learning model trainer 234 to generate virtual object engagement training set instances 400; to include in a virtual object engagement training set 400 upon receiving feedback on the real-world outcome for a particular user, such as purchase, not purchase, additional inquiries, etc. The trainer 234 may further generate real-world engagement training set instances 500; to include in a real-world engagement training set 500 upon receiving feedback on the real-world outcome for a particular user. These training sets 400 and 500 may be used to train the machine learning models 212 and 226, respectively. In one embodiment, the extended-reality headset 104 may comprise a type of computer vision glasses to render extended-reality virtual objects. The extended-reality headset 104 may further comprise a gaze tracking device to receive a gazed virtual object detected by eye tracking cameras that acquire the gazed virtual object on which the tracked eye is fixed and information on coordinates of an axis of a line-of-sight, also referred to as sightline, visual axis, the user is viewing within the field of vision captured by the gaze tracking device tracking. Extended-reality smart glasses are wearable computer-capable glasses that generate virtual objects, such as three-dimensional images, text, animations, and videos, to overlay into the wearer's field of vision so the digital information is viewable along with real-world scenes in the wearer's field of vision. The headset 104 may further provide augmented reality (AR) virtual objects. Augmented reality is used to supplement information presented to users on items they are looking at, such as augmented reality controls to control items in the wearer's field of vision or information on locations in the field of vision. Additionally, the extended-reality headset 104 may provide extended-reality virtual objects that interact with the real-world. For instance, an extended-reality virtual object may react to the user 100 in the same way it would in the real-world, such as appear closer to the user as the user moves closer to the virtual object.

The extended-reality headset 104 may include a processor, display, sensors and input devices, and may include many of the components found in smartphones and tablet computers. Extended-reality rendering may be performed by optical projection systems, monitors, handheld devices, and display systems worn on the human body. A head-mounted display (HMD) is a display device worn on the forehead, such as a harness or helmet-mounted. HMDs place images of both the physical world and virtual objects over the user's field of view. HMDs may employ sensors for six degrees of freedom monitoring that allow the system to align virtual information to the physical world and adjust accordingly with the user's head movements. The HMDs may also implement gesture controls for full virtual immersion.

Extended-reality displays may be rendered on devices resembling eyeglasses, and employ cameras to intercept real-world view and re-display its augmented view through the eye pieces and devices in which MR imagery is projected through or reflected off the surfaces of the eyewear lens places. Other implementations of MR displays include a head-up display (HUD), which is a transparent display that presents data without requiring users to look away from their usual viewpoints. Extended-reality may include overlaying the information and registration and tracking between the superimposed perceptions, sensations, information, data, and images and some portion of the real-world. Additional extended-reality implementations include contact lenses and virtual retinal display, where $\alpha$ display is scanned directly into the retina of a viewer's eye. EyeTap augmented reality devices capture rays of light that would otherwise pass through the center of the lens of the wearer's eye, and substitutes synthetic computer-controlled light for each ray of real light. The extended-reality headset 104 may further use motion tracking technologies, including digital cameras and/or other optical sensors, accelerometers, GPS, gyroscopes, solid state compasses, radio-frequency identification (RFID).

Extended reality, as that term is used herein, refers to any of virtual reality (VR), where the entire view of the user is synthetic imagery, augmented reality (AR) where virtual objects or synthetic imagery are added to a view of a real environment, mixed reality (MR) where there is a combination of synthetic and real imagery to form the space, and augmented virtuality (AV) where real imagery is added to a synthetic environment. Thus, extended reality, as that term is used herein, falls on the continuum from total virtuality or total synthetic imagery to a combination of synthetic and real imagery.

In a virtual reality environment, the extended-reality display 104 renders the entire environment so the participant is fully immersed in the environment 110 without being able to visualize their external environment. A virtual reality environment may comprise an entirely different environment than that in the real-world location 102. Alternatively, a virtual reality environment may render the actual real-world location environment along with virtual elements. In an augmented reality environment, elements of the extended-reality environment 110, such as the virtual object

108 and virtual agent 121, are rendered within the participant's real-world environment, such as superimposed within the real-world environment.

The network 116 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIGS. 1 and 2 between the components and objects in the extended-reality computer 112 and the extended-reality server 200 represent a data flow between the components.

Generally, program modules, such as the program components 121, 122, 124, 126, 128, 132, 136, 202, 204, 212, 220, 226, 230, 234 of systems 112 and 200, among others, may comprise routines, programs, objects, components, logic, data structures, and so on that perform particular tasks or implement particular abstract data types. The program components and hardware devices of the systems 112 and 200 in FIGS. 1 and 2 may be implemented in one or more computer systems, where if they are implemented in multiple computer systems, then the computer systems may communicate over a network.

The program components 121, 122, 124, 126, 128, 132, 136, 202, 204, 212, 220, 226, 230, 234, among others, may be accessed by a processor from memory to execute. Alternatively, some or all of the program components 121, 122, 124, 126, 128, 132, 136, 202, 204, 212, 220, 226, 230, 234, among others, may be implemented in separate hardware devices, such as Application Specific Integrated Circuit (ASIC) hardware devices.

The functions described as performed by the program components 121, 122, 124, 126, 128, 132, 136, 202, 204, 212, 220, 226, 230, 234, among others, may be implemented as program code in fewer program modules than shown or implemented as program code throughout a greater number of program modules than shown.

The extended-reality computer 112 may comprise a personal computing device, such as a laptop, desktop computer, tablet, smartphone, wearable computer, etc. The server 200 may comprise one or more server class computing devices, or other suitable computing devices. Alternatively, the extended-reality computer 112 may be embedded in the extended-reality headset 104.

In described embodiments, the virtual object engagement manager 202 is maintained in the extended-reality server 200. In alternative embodiments, some are all of the components of the virtual object engagement manager 202 may be maintained in the extended-reality computer 112 to perform these operations locally in the user machine.

Certain of the program components, such as 212, 220, 226, among others, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output having specified confidence levels based on the input parameters. The machine learning models 212, 220, 226 may be trained to produce their output for engagement scores and key-point summaries based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In an alternative embodiment, the components 212, 220, 226 may be implemented not as a machine learning model but implemented using a rules based system to determine the outputs from the inputs. The components 212, 220, 226 may further be implemented using an unsupervised machine learning module, or machine learning implemented in methods other than neural networks, such as multivariable linear regression models.

Components implemented as a machine learning model may be implemented in programs in memory or in hardware components, such as a hardware accelerator or an inference engine.

In described embodiments, the extended-reality engine 204 may implement a metaverse rendered at numerous user extended-reality computers 112. In alternative embodiments, the extended-reality engine 204 may render an entertainment, organizational, business, or personal virtual world.

Figure 3:
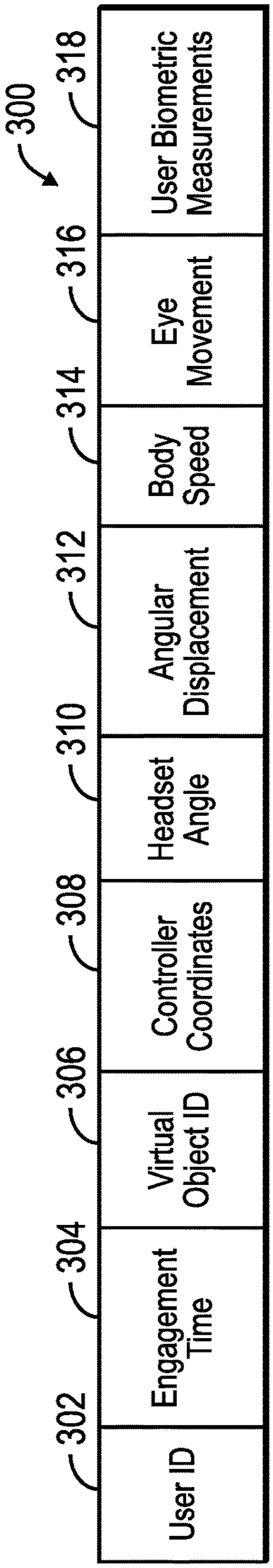
FIG. 3 illustrates an embodiment of real-world movement parameters detected from the user movement in the real-world while interacting with a virtual object in the virtual world.

FIG. 3 illustrates an embodiment of the real-world movement parameters 300 generated by the movement parameter generator 126 and may include: a user identifier (ID) 302 of the user 100; engagement time 304 comprising a time range during which the user 302 engaged with a virtual object 306; controller coordinates 308 indicating coordinates of the extended-reality controllers 106 during the engagement time 304; headset angle 310 of an angle of the headset 104 during the engagement time 304; a derivate value, such as angular displacement 312 calculated from movement parameters, during the engagement time 304, including body speed 314 sensed by the cameras 118*a*, 118*b*, 118*c*, eye movement 316 captured by the headset 104 sensors; and user biometric measurements 318 gathered by the sensor device 120.

Figure 4:
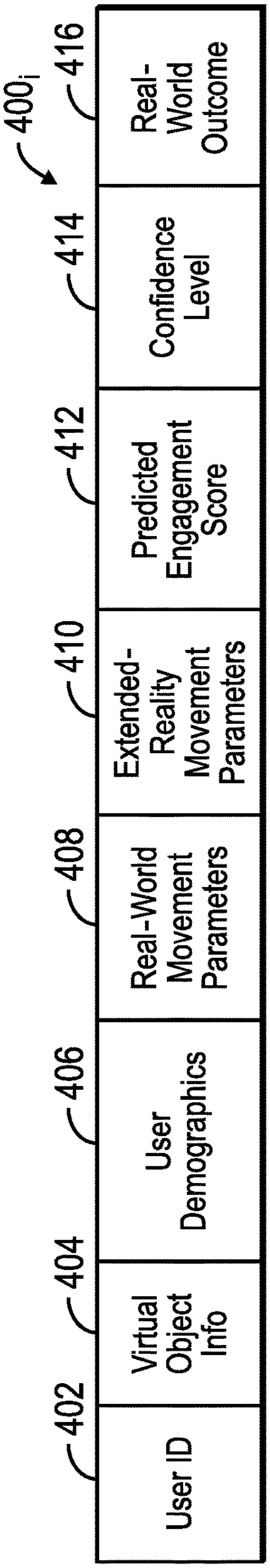
FIG. 4 illustrates an embodiment of a virtual object engagement training set instance to include in a training set to train a movement engagement machine learning model that outputs a predicted user engagement with a real-world entity represented by the virtual object from the movement parameters and other information.

FIG. 4 illustrates an embodiment of a virtual object engagement training set instance 400; and may comprise: a user ID 402 of the user for which he information was generated; virtual object information 404 on the virtual object 108 such as information 208, e.g., category, presentation details, etc.; user demographics 406 of the user 402. The parameters 408, 410, and 412 may comprise information 300, 210, 214. A confidence level 414 of the engagement score 412 indicates a likelihood the engagement score 412 is correct; and a quantized real-world outcome 418 of the user engagement, such as certain types of interactions, acquisition, purchase, no purchase, etc. The real-world outcome would be gathered from external sources in the real-world.

Figure 5:
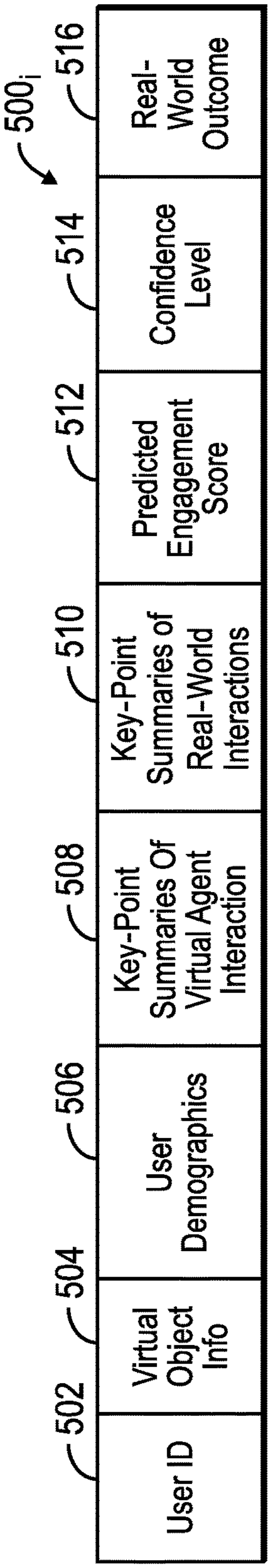
FIG. 5 illustrates an embodiment of a real-world engagement training set instance to include in a training set to train a real-world engagement machine learning model that outputs a predicted user engagement with a real-world entity based on user information gathering on the real-world entity.

FIG. 5 illustrates an embodiment of a real-world engagement training set instance 500$_i$. The parameters 502, 504, 506, and 516 may comprise the same information as in parameters 402, 404, 406, and 416, respectively, in FIG. 4. Parameters 508, 510, and 512 may comprise the generated information 222, 224, and 228, respectively. A confidence level 514 of the engagement score 512 indicates a likelihood the engagement score 512 is correct.

Figure 6:
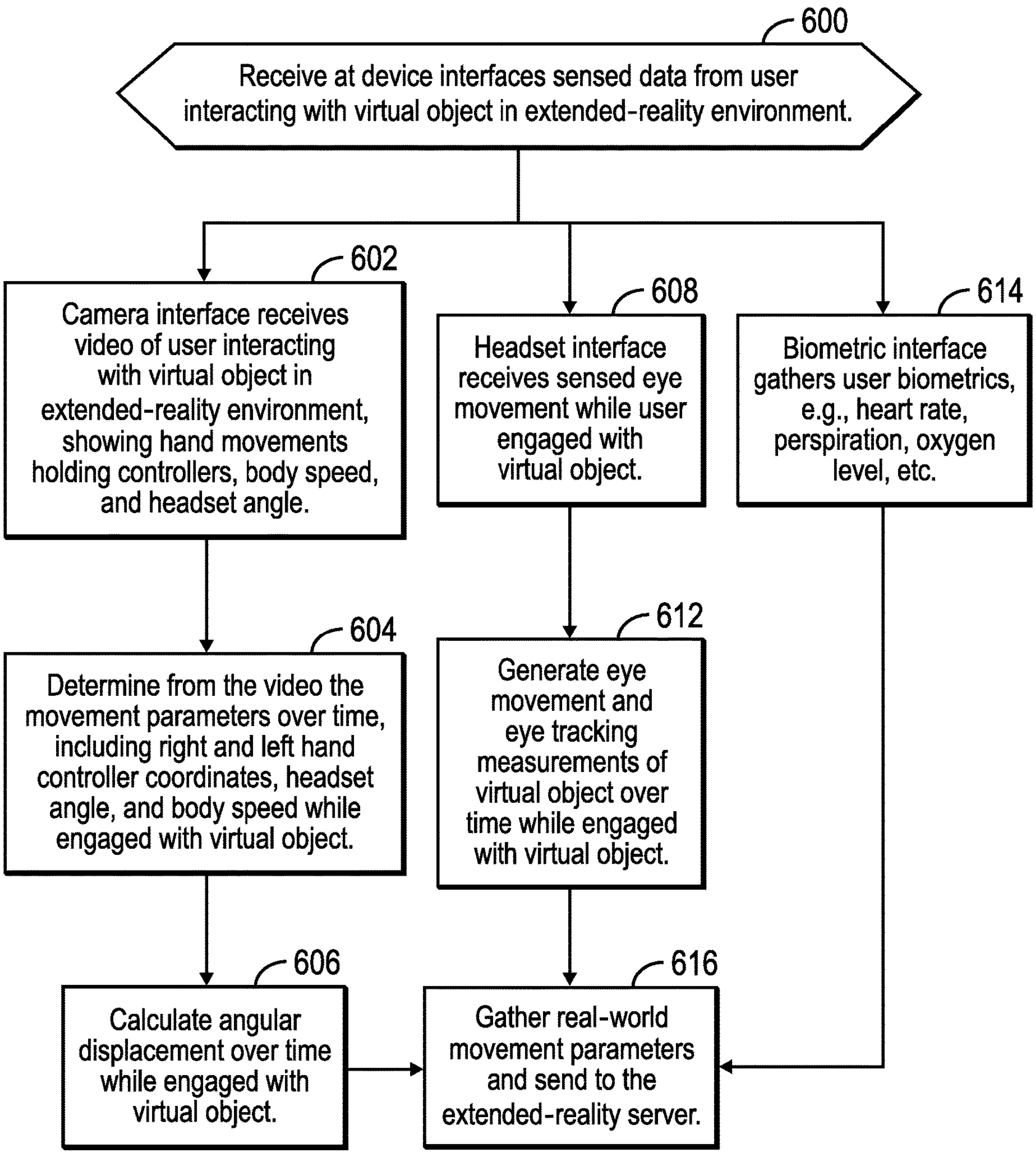
FIG. 6 illustrates an embodiment of operations to generate real-world movement parameters based on user movement in the real-world while interacting with a virtual object in an extended-reality environment.

FIG. 6 illustrates an embodiment of operations performed by the movement parameter generator components, including the interfaces 128, 132, 136, e.g., software drives. Upon receiving (at block 600) at the device interfaces 128, 132, 136 sensed data from the user 100 interacting with a virtual object 108 in the extended-reality environment 110, the operations at blocks 602, 608, and 614 may be performed in parallel. The camera interface 136 receives (at block 602) video from the cameras 118*a*, 118*b*, 118*c* of the user 100 in the real-world location 102, while interacting with the virtual object 108 in the extended-reality environment 110, showing hand movements holding the controllers 106, body speed, and headset 104 angle. The camera interface 136 determines (at block 604), from the captured video and sensed body speed, movement parameters over time, including right and left hand controller coordinates 308, headset angle 310, and body speed 314 while the user is engaged with the virtual object 108. The movement parameter generator 126 may generate (at block 606) derivative information from the measured parameters, such as angular displacement 312, physical engagement score, e.g., angular displacement 312 divided by body speed over time.

The headset interface 132 receives (at block 608), through sensors in the headset 104, sensed user 100 eye movement while the user 100 is engaged with the virtual object 108. The headset interface 132 generates (at block 612) eye movement and eye tracking measurements of the virtual object 108 over time while the user 100 is engaged with virtual object 108. The biometric device interface 128 gathers (at block 614) user biometrics, e.g., heart rate, perspiration, oxygen level, etc. All the gathered information, at blocks 604, 606, 612, and 614, is stored (at block 616) in the real-world movement parameters 300 for this virtual object 108 engagement session, and sent to the extended-reality server 200 for processing.

With the embodiment of FIG. 6, the user extended-reality computer 114 may gather the captured information related to user 100 movement in the real-world location 102 while interacting with a virtual object 108 in the extended-reality environment 110 for the engagement time.

Figure 7:
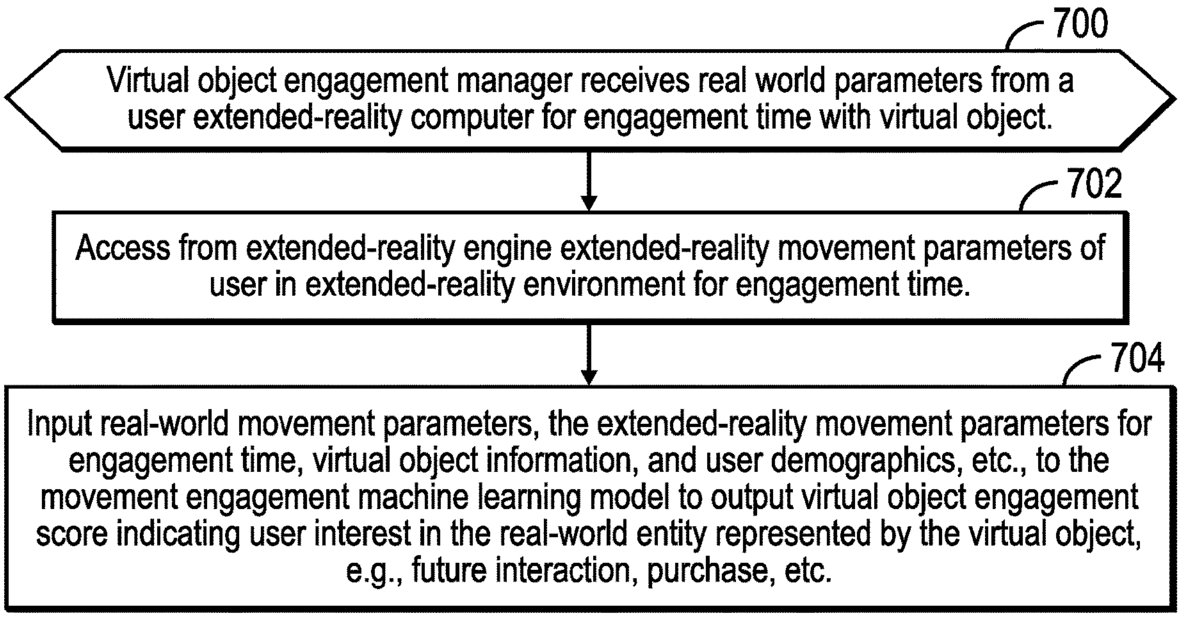
FIG. 7 illustrates an embodiment of operations to use a movement engagement machine learning model to output a virtual object engagement score indicating user likelihood to engage with the real-world entity in the real world.
Figure 8:
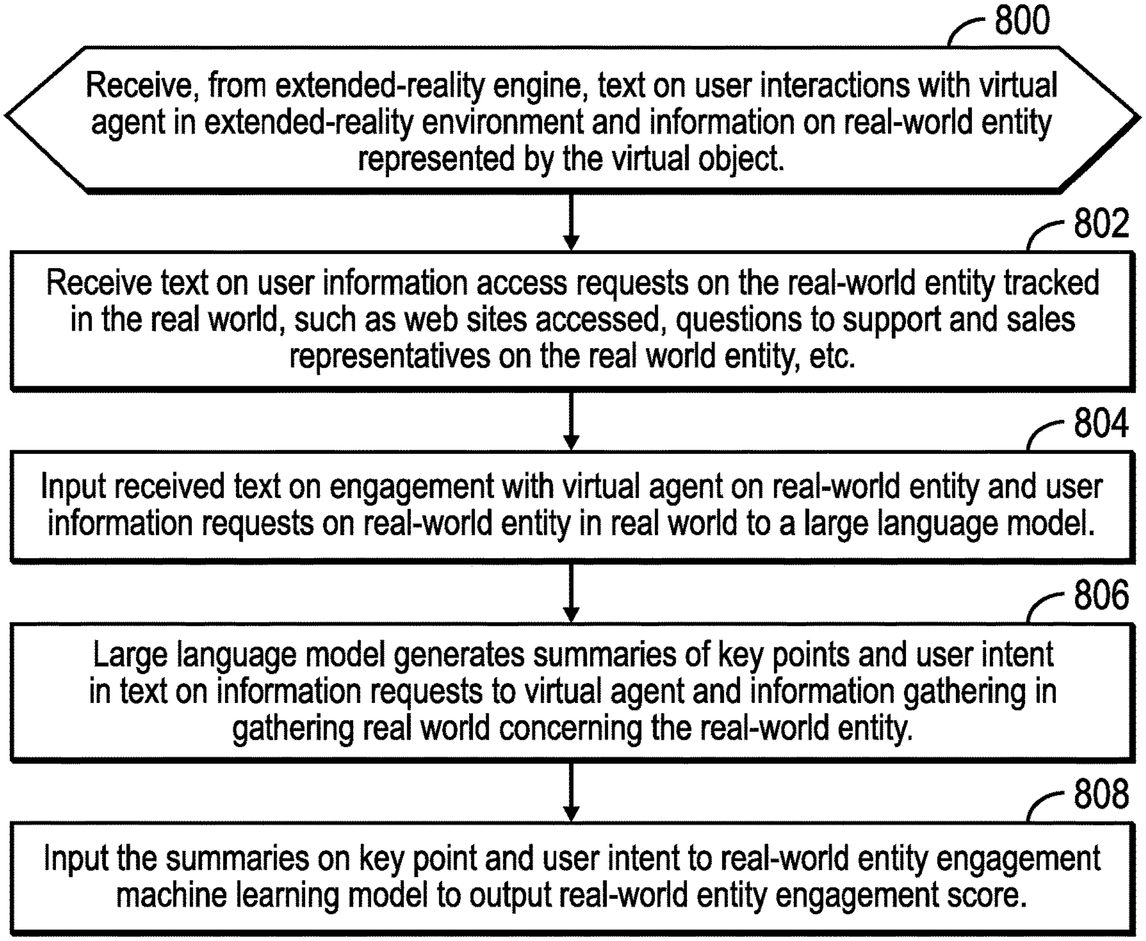
FIG. 8 illustrates an embodiment of operations to use a real-world entity engagement machine learning model to output a real-world engagement score indicating user likelihood to engage with the real-world entity in the real world.

FIG. 7 illustrates an embodiment of operations performed by components of the virtual object engagement manager 202 to generate the virtual object engagement score 214. Upon receiving (at block 700) the real-world movement parameters 300 from a user extended-reality computer 112 for an engagement time with the virtual object 108, the virtual object engagement manager 202 accesses (at block 702), from the extended-reality engine 204, extended-reality movement parameters 210 of the user 100 virtual movements in the extended-reality environment 110 for the engagement time. The virtual object engagement manager 202 inputs (at block 704) the real-world movement parameters 300, the extended-reality movement parameters 210 for the engagement time, virtual object information and user demographics 208, and other information having high predictive qualities, to the movement engagement machine learning model 212 to output a virtual object engagement score 214 indicating the user 100 interest in the real-world entity represented by the virtual object 108, e.g., such as predicted future interaction, acquisition, purchase, no purchase, etc FIG. 8 illustrates an embodiment of operations performed by components of the virtual object engagement manager 202 to generate the real-world engagement score 228. The virtual object engagement manager 202 receives (at block 800), from extended-reality engine 204, text on user interactions with virtual agent 216 in the extended-reality environment 110 and information on the on real-world entity represented by the virtual object 108. The virtual object engagement manager 202 further receives (at block 802) text on user information access requests on the real-world entity tracked in the real world 218, such as web sites accessed, questions to support and sales representatives on the real-world entity, etc. The received text on engagement with virtual agent 216 and the user information requests on real-world entity in real world 218 are inputted (at block 804) to the large language model 220. The large language model 220 generates (at block 806) summaries of key points and user intent in text on information requests to virtual agent 121 and information gathering in real-world concerning the real-world entity 224. These text summaries and information on intent 222 and 224 are inputted (at block 808) to the real-world entity engagement machine learning model 226 to output a real-world entity engagement score 228.

With the described embodiments, manifestations of physical movements of the user 100 at the real-world location 102 are captured and used to generate an engagement score based on the user movement, biometrics, eye movements, etc. Further, at the same time, text of user information access requests to a virtual agent 121 and/or information gathering in the real-world are inputted to a separate machine learning model 226 to generate an engagement score 228 based on user activity with respect to gathering and requesting information on the real-world entity.

Figure 9:
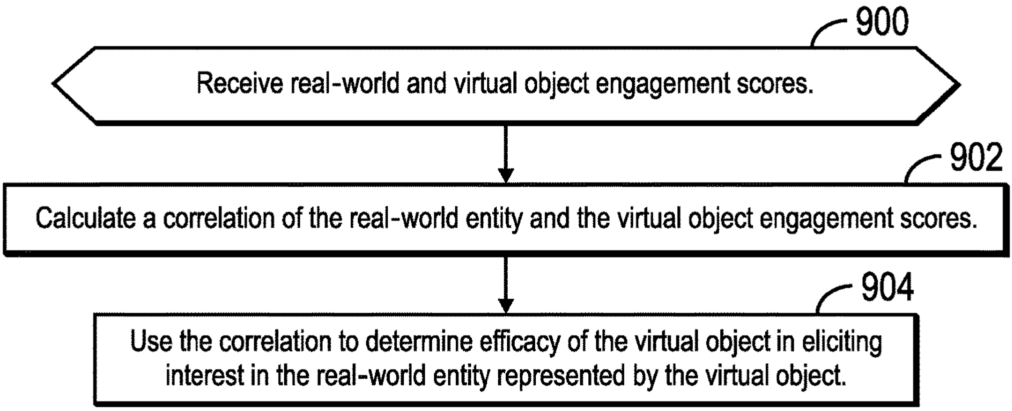
FIG. 9 illustrates an embodiment of operations to analyze the virtual object and real-world engagement scores.

FIG. 9 illustrates an embodiment of operations performed by the engagement score analyzer 230 to further use the two different engagement scores 214 and 228 to glean information on the efficacy of the virtual object 108 in promoting user interest in the real-world entity represented by the virtual object 108, including acquisition or purchase of the real-world entity in embodiments when the real-world entity is a product or service and the virtual object 108 comprises an advertisement. Upon the engagement score analyzer 230 receiving (at block 900) the real-world 228 and virtual object 214 engagement scores, the engagement score analyzer 230 calculates (at block 902) a correlation of the real-world entity 228 and the virtual object 214 engagement scores indicating whether they correlate are indicate the same level of engagement. The correlation may be used to determine (at block 904) the efficacy of the virtual object 108 in eliciting interest in the real-world entity represented by the virtual object 108 using a rules based heuristic algorithm.

For instance, the real-world engagement score 228, based on information the user gathers on the real-world entity in the real world, may confirm each other or indicate they cannot be validated. For instance, the engagement score analyzer 230 may implement heuristic rules such that if the virtual object engagement score 214 is low, but the real-world engagement score 228 is high, then even though the virtual object 108 failed to affect engagement with the user, the user interest in the real-world entity was nonetheless high. Such a disparity may indicate the virtual object 214 is inadequate and needs to be improved in how it appears to the user in the extended-reality environment 110 to improve engagement in the extended-reality world. Yet further, a high virtual object engagement score 214 but a low real-world engagement score 228 indicates that although the virtual object 108 is appealing and draws in users, it may not be attracting a group of users who would be interested in the real-world entity. In such case, the heuristic rules may suggest to the provider of the virtual object 108 to target the virtual object 108 to different audiences who are more likely to be prospective purchasers of the real-world entity, as opposed to those having no interest to acquire or further engage.

Figure 10:
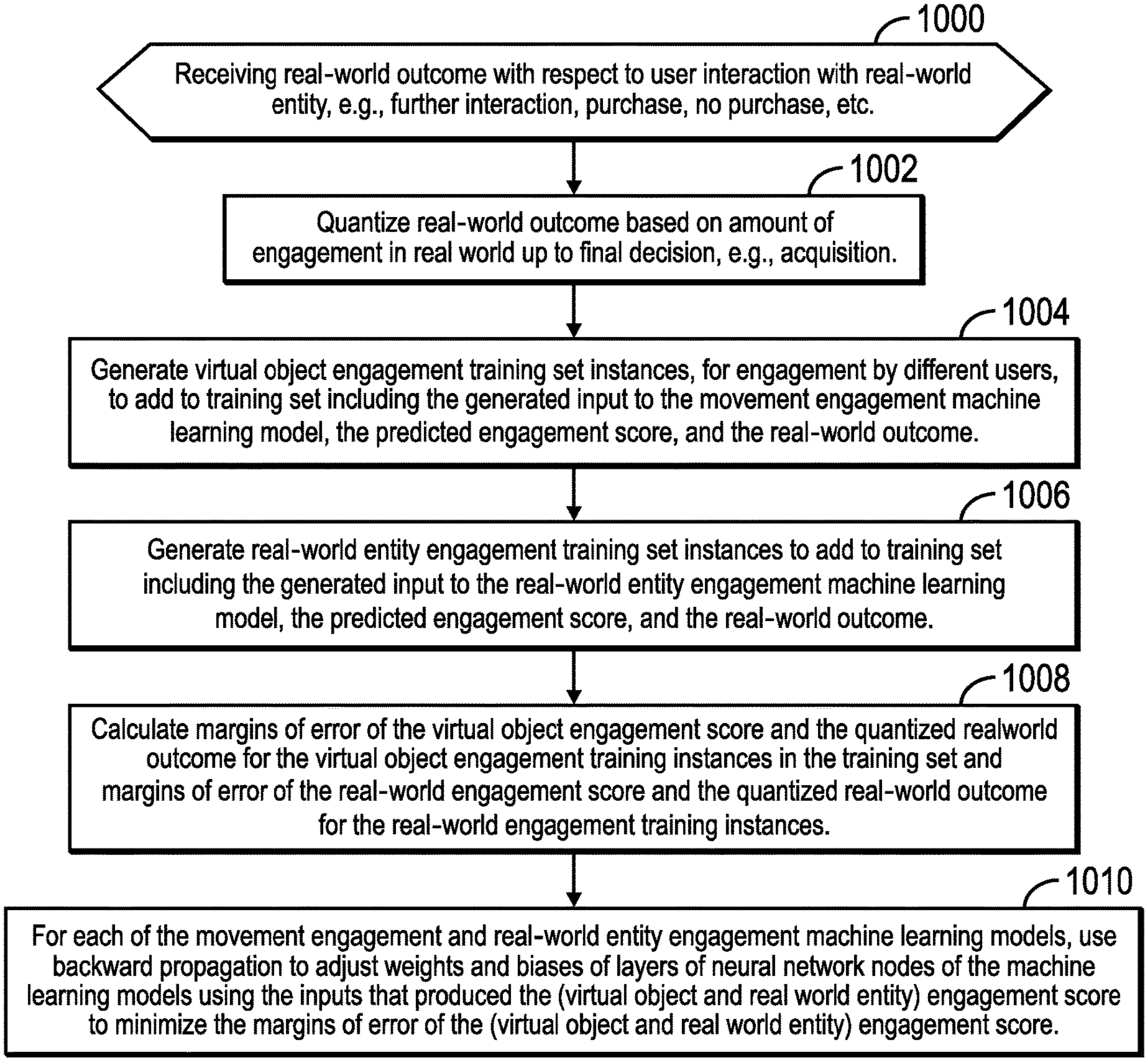
FIG. 10 illustrates an embodiment of operations to train the movement engagement and the real-world entity engagement machine learning models.

FIG. 10 illustrates an embodiment of operations performed by the engagement machine learning model trainer 234 to train the machine learning models 212, 226 to minimize an error between the predicted engagement scores 214, 228 and the real-world outcome. Upon receiving (at block 1000) a real-world outcome with respect to user interaction with a real-world entity, e.g., further interaction, purchase, no purchase, etc., the received real-world outcome may be quantized (at block 1002) to normalize with the engagement score scale based on amount of engagement in real world up to final decision, e.g., acquisition or no acquisition. Virtual object engagement training set instances 400; are generated (at block 1004), for engagement by different users, to add to a training set 400 including the generated input 208, 300, 210 to the movement engagement machine learning model 212, the predicted engagement score 214, and the quantized real-world outcome 416. Real-world entity engagement training set instances 500; are generated (at block 1006) to add to training set 500, including the generated input 222, 224 to the real-world entity engagement machine learning model 226, the predicted engagement score 228, and the real-world outcome.

The trainer 234 calculates (at block 1008) margins of error of the virtual object engagement score 214 and the quantized real-world outcome 416 for the virtual object engagement training set instances 400; in the training set 400 and margins of error of the real-world engagement score 228 and the quantized real-world outcome 516 for the real-world engagement training set instances 500; in the training set 500. For each of the movement engagement 212 and real-world entity engagement 228 machine learning models, the trainer 234 may use (at block 1010) backward propagation to adjust weights and biases of layers of neural network nodes of the machine learning models 212, 226, using the inputs that produced the (virtual object and real world entity) engagement score to minimize the margins of error of the (virtual object and real world entity) engagement score.

With the embodiment of FIG. 10, the movement engagement machine learning model 212 is trained to predict an engagement score 214 of a real-world outcome, such as purchase, based on user interactions observed in the real-world while interacting with a virtual object 108 in the extended-reality environment 110. In this way, one can predict a user ultimate decision, such as purchase, no purchase, with respect to a real-world entity based on their observed corporeal reactions while interacting in the extended-reality environment 110. Further, user information gathering activities with respect to the real-world entity in the virtual world 110 and real world may separately be used to predict engagement and be trained to predict engagement based on the real-world outcomes.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
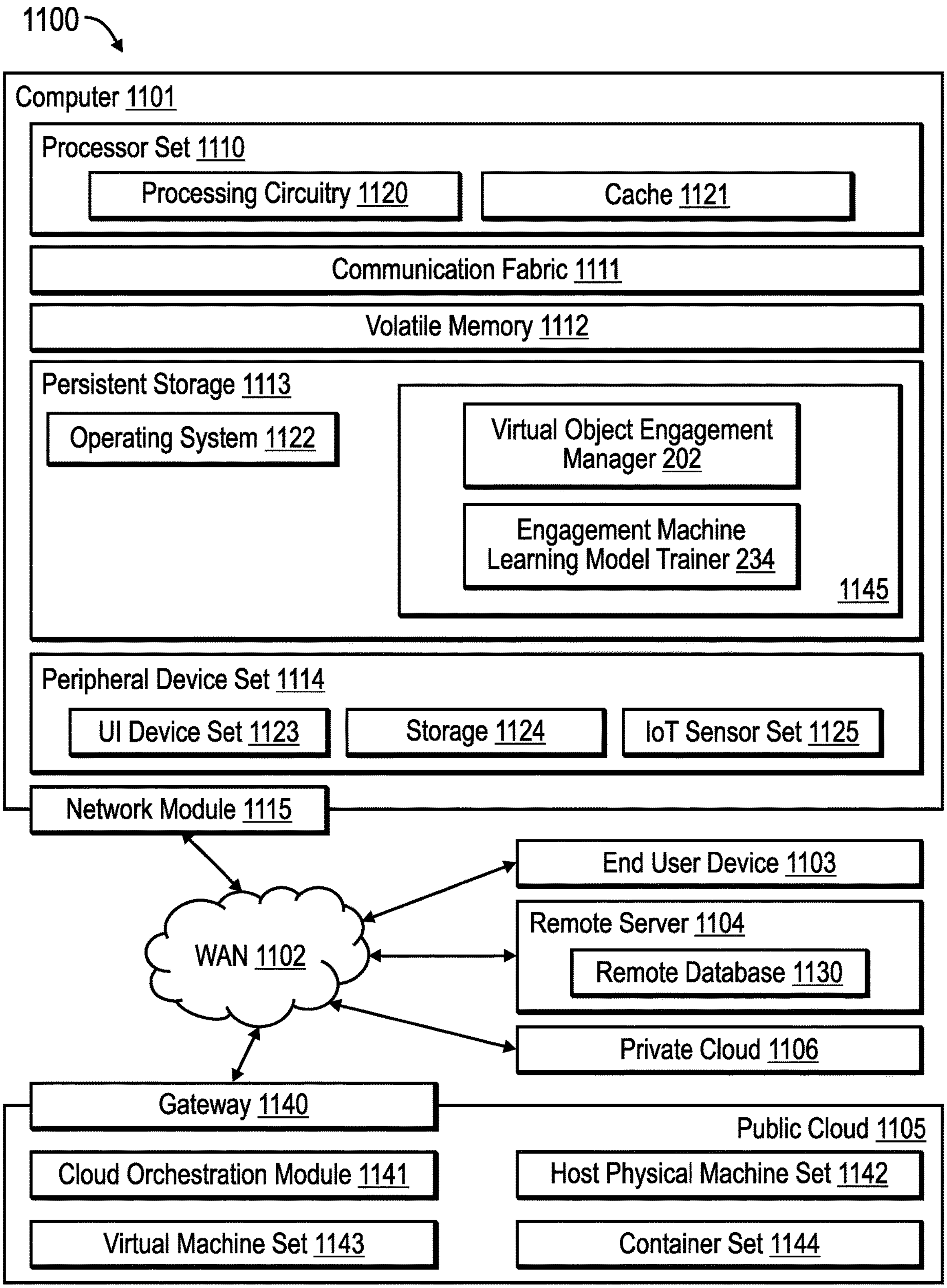
FIG. 11 illustrates a computing environment in which the components of FIGS. 1 and 2 may be implemented.

With respect to FIG. 11, computing environment 1100 contains an example of an environment for the execution of at least some of the computer code involved in performing the inventive methods, such as the components in block 1145, including the virtual object engagement manager 202, to determine and analyze a virtual object engagement score 214 and real-world engagement score 228 indicating a user likelihood to further engage with a real-world entity represented by a virtual object 108, and the engagement machine learning model trainer 234 to train the machine learning models 212, 226 used to determine the engagement scores 214, 228. In addition to block 1145, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1145, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer-readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1145 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1145 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer-readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on. The EUD 1103 may comprise the extended reality computer 112 used to render the extended-reality environment 110 for users.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud. CLOUD COMPUTING SERVICES AND/OR MICROSERVICES (not separately shown in FIG. 11): private and public clouds 1106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet.

Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where α service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining an engagement score of a user for a real-world entity represented by a virtual object in an extended-reality environment, the computer program product comprising a computer readable storage medium having computer readable program code embodied therein that is executable to perform operations, the operations comprising:

receiving, from a tracking device, movement parameters from a user in a real-world while the user is interacting with a virtual object in the extended-reality environment;

processing, by a movement engagement machine learning model, the movement parameters to determine a first engagement score indicating a first likelihood the user further interacts with or acquires the real-world entity represented by the virtual object based on user interaction with the virtual object, wherein the movement engagement machine learning module is trained to output a predicted engagement score indicating a likelihood of a further interaction with a real-world entity represented by the virtual object in the extended-reality environment from input comprising movement parameters from a user in the real-world while interacting with the virtual object in the extended-reality environment;

determining information on user information access requests with respect to the real-world entity based on user activity with respect to gathering and requesting information on the real-world entity;

inputting the information on the user information access requests to a real-world entity engagement machine learning model to output a second engagement score indicating a second likelihood the user further interacts with the real-world entity, wherein the real-world entity engagement machine learning model is trained to output a predicted engagement score indicating a likelihood of a further interaction with the real-world entity from input comprising user information requests with respect to the real-world entity;

determining a correlation between the first engagement score and the second engagement score to confirm an extent to which the first engagement score and the second engagement score indicate a similar level of engagement with the real-world entity; and modifying a presentation of the virtual object in the extended-reality environment by controlling an extended reality generator that renders in an extended reality display device the modified presentation of the virtual object to superimpose within a real-world environment in which the user is located in response to determining lack of correlation between the first engagement score and the second engagement score, wherein in response to the correlation indicating the first engagement score is low relative to the second engagement score, enhancing appearance of the virtual object in the extended-reality environment to increase engagement with the virtual object in the extended-reality environment, and wherein in response to the correlation indicating the first engagement score is high relative to the second engagement score, modifying the virtual object to target a group of users more likely to be interested in the real-world entity.

2. The computer program product of claim 1, wherein the correlation is used to determine an efficacy of the virtual object in promoting interest in the real-world entity.

3. The computer program product of claim 1, wherein the tracking device includes a camera to record the movement parameters of the user moving in the real-world and an extended-reality headset to capture user eye movements during interaction with the virtual object in the extended-reality environment, wherein the determining the first engagement score comprises:

inputting the movement parameters and the user eye movements to the movement engagement machine learning model to output the first engagement score.

4. The computer program product of claim 3, wherein the movement parameters include, over an engagement time of the user interaction with the virtual object, right-hand extended-reality controller handset coordinates, left-hand extended-reality controller handset coordinates, headset angles, and body speeds.

5. The computer program product of claim 3, wherein the determining the first engagement score comprises:

calculating angular displacements, during engagement time, as a function of the movement parameters comprising handset controller movement coordinates and headset angles, wherein the movement parameters inputted to the movement engagement machine learning model comprise the angular displacements.

6. The computer program product of claim 1, wherein the determining the information on the user information access requests with respect to the real-world entity comprises:

determining user questions entered into a virtual agent rendered in the extended-reality environment concerning the real-world entity; and processing, by a large language model, the user questions to output summaries of key points of the user questions and user intent with respect to the real-world entity, wherein the summaries of the key points and the user intent are entered into the real-world entity engagement machine learning model to determine the second engagement score.

7. The computer program product of claim 1, wherein the determining the information on the user information access requests with respect to the real-world entity comprises:

tracking information on the real-world entity the user accessed at computer network locations external to the extended-reality environment, wherein information on the tracked information is entered into the real-world entity engagement machine learning model to determine the second engagement score.

8. The computer program product of claim 1, wherein the virtual object comprises an advertisement of the real-world entity comprising an advertised product or service, and wherein the engagement score indicates a likelihood the user will purchase the advertised product or service in the real-world.

9. The computer program product of claim 1, w, wherein the operations further comprise:

receiving real-world outcomes with respect to users, for which the first engagement score and the second engagement score are generated, interacting with the real-world entity;

generating a first training set including movement parameters for multiple users interacting with the virtual object, first engagement scores for the multiple users, a quantized real-world outcomes, and margins of error between the first engagement scores and the quantized real-world outcomes; and training the movement engagement machine learning model to output first engagement scores that minimize the margins of error.

10. The computer program product of claim 9, wherein the operations further comprise:

generating a second training set including the information on the user information access requests for multiple users interacting with the virtual object, second engagement scores for the multiple users, the quantized real-world outcomes, and margins of error between the second engagement scores and the quantized real-world outcomes; and training the real-world entity engagement machine learning model to output second engagement scores that minimize the margins of error.

11. A system for determining an engagement score of a user for a real-world entity represented by a virtual object in an extended-reality environment, comprising:

a processor; and a computer readable storage medium having computer readable program code embodied therein that when executed by the processor performs operations, the operations comprising:

receiving, from a tracking device, movement parameters from a user in a real-world while the user is interacting with a virtual object in the extended-reality environment;

processing, by a movement engagement machine learning model, the movement parameters to determine a first engagement score indicating first likelihood the user further interacts with or acquires the real-world entity represented by the virtual object based on user interaction with the virtual object, wherein the movement engagement machine learning module is trained to output a predicted engagement score indicating a likelihood of a further interaction with a real-world entity represented by the virtual object in the extended-reality environment from input comprising movement parameters from a user in the real-world while interacting with the virtual object in the extended-reality environment;

determining information on user information access requests with respect to the real-world entity based on user activity with respect to gathering and requesting information on the real-world entity;

inputting the information on the user information access requests to a real-world entity engagement machine learning model to output a second engagement score indicating a second likelihood the user further interacts with the real-world entity, wherein the real-world entity engagement machine learning model is trained to output a predicted engagement score indicating a likelihood of a further interaction with the real-world entity from input comprising user information requests with respect to the real-world entity;

determining a correlation between the first engagement score and the second engagement score to confirm an extent to which the first engagement score and the second engagement score indicate a similar level of engagement with the real-world entity; and modifying a presentation of the virtual object in the extended-reality environment by controlling an extended reality generator that renders in an extended reality display device the modified presentation of the virtual object to superimpose within a real-world environment in which the user is located in response to determining lack of correlation between the first and the second engagement scores, wherein in response to the correlation indicating the first engagement score is low relative to the second engagement score, enhancing appearance of the virtual object in the extended-reality environment to increase engagement with the virtual object in the extended-reality environment, and wherein in response to the correlation indicating the first engagement score is high relative to the second engagement score, modifying the virtual object to target a group of users more likely to be interested in the real-world entity.

12. The system of claim 11, wherein the tracking device includes a camera to record the movement parameters of the user moving in the real-world and an extended-reality headset to capture user eye movements during interaction with the virtual object in the extended-reality environment, wherein the determining the first engagement score comprises:

inputting the movement parameters and the user eye movements to the movement engagement machine learning model to output the first engagement score.

13. The system of claim 12, wherein the determining the first engagement score comprises:

calculating angular displacements, during engagement time, as a function of the movement parameters comprising handset controller movement coordinates and headset angles, wherein the movement parameters inputted to the movement engagement machine learning model comprise the angular displacements.

14. The system of claim 11, wherein the determining the information on the user information access requests with respect to the real-world entity comprises:

determining user questions entered into a virtual agent rendered in the extended-reality environment concerning the real-world entity; and processing, by a large language model, the user questions to output summaries of key points of the user questions and user intent with respect to the real-world entity, wherein the summaries of the key points and the user intent are entered into the real-world entity engagement machine learning model to determine the second engagement score.

15. The system of claim 11, wherein the operations further comprise:

receiving real-world outcomes with respect to users, for which the first engagement score and the second engagement score are generated, interacting with the real-world entity;

generating a first training set including movement parameters for multiple users interacting with the virtual object, first engagement scores for the multiple users, a quantized real-world outcomes, and margins of error between the first engagement scores and the quantized real-world outcomes; and training the movement engagement machine learning model to output first engagement scores that minimize the margins of error.

16. A computer implemented method for determining an engagement score of a user for a real-world entity represented by a virtual object in an extended-reality environment, comprising:

receiving, from a tracking device, movement parameters from a user in a real-world while the user is interacting with a virtual object in the extended-reality environment;

processing, by a movement engagement machine learning model, the movement parameters to determine a first engagement score indicating a first likelihood the user further interacts with or acquires the real-world entity represented by the virtual object based on user interaction with the virtual object, wherein the movement engagement machine learning module is trained to output a predicted engagement score indicating a likelihood of a further interaction with a real-world entity represented by the virtual object in the extended-reality environment from input comprising movement parameters from a user in the real-world while interacting with the virtual object in the extended-reality environment;

determining information on user information access requests with respect to the real-world entity based on user activity with respect to gathering and requesting information on the real-world entity;

inputting the information on the user information access requests to a real-world entity engagement machine learning model to output a second engagement score indicating a second likelihood the user further interacts with the real-world entity, wherein the real-world entity engagement machine learning model is trained to output a predicted engagement score indicating a likelihood of a further interaction with the real-world entity from input comprising user information requests with respect to the real-world entity;

determining a correlation between the first engagement score and the second engagement score to confirm an extent to which the first engagement score and the second engagement score indicate a similar level of engagement with the real-world entity; and modifying a presentation of the virtual object in the extended-reality environment by controlling an extended reality generator that renders in an extended reality display device the modified presentation of the virtual object to superimpose within a real-world environment in which the user is located in response to determining lack of correlation between the first engagement score and the second engagement score, wherein in response to the correlation indicating the first engagement score is low relative to the second engagement score, enhancing appearance of the virtual object in the extended-reality environment to increase engagement with the virtual object in the extended-reality environment, and wherein in response to the correlation indicating the first engagement score is high relative to the second engagement score, modifying the virtual object to target a group of users more likely to be interested in the real-world entity.

17. The method of claim 16, wherein the tracking device includes a camera to record the movement parameters of the user moving in the real-world and an extended-reality headset to capture user eye movements during interaction with the virtual object in the extended-reality environment, wherein the determining the first engagement score comprises:

inputting the movement parameters and the user eye movements to the movement engagement machine learning model to output the first engagement score.

18. The method of claim 17, wherein the determining the first engagement score comprises:

calculating angular displacements, during engagement time, as a function of the movement parameters comprising handset controller movement coordinates and headset angles, wherein the movement parameters inputted to the movement engagement machine learning model comprise the angular displacements.

19. The method of claim 16, wherein the determining the information on the user information access requests with respect to the real-world entity comprises:

determining user questions entered into a virtual agent rendered in the extended-reality environment concerning the real-world entity; and processing, by a large language model, the user questions to output summaries of key points of the user questions and user intent with respect to the real-world entity, wherein the summaries of the key points and the user intent are entered into the real-world entity engagement machine learning model to determine the second engagement score.

20. The method of claim 16, further comprising:

receiving real-world outcomes with respect to users, for which the first engagement score and the second engagement score are generated, interacting with the real-world entity;

generating a first training set including movement parameters for multiple users interacting with the virtual object, first engagement scores for the multiple users, a quantized real-world outcomes, and margins of error between the first engagement scores and the quantized real-world outcomes; and training the movement engagement machine learning model to output first engagement scores that minimize the margins of error.

* * * * *